A. J. ROWLEDGE.
VARIABLE SPEED GEAR.
APPLICATION FILED MAY 1, 1916.

1,256,372.

Patented Feb. 12, 1918.
4 SHEETS—SHEET 1.

A. J. ROWLEDGE.
VARIABLE SPEED GEAR.
APPLICATION FILED MAY 1, 1916.

1,256,372.

Patented Feb. 12, 1918.
4 SHEETS—SHEET 2.

UNITED STATES PATENT OFFICE.

ARTHUR JOHN ROWLEDGE, OF LONDON, ENGLAND, ASSIGNOR TO D. NAPIER & SON LIMITED, OF LONDON, ENGLAND.

VARIABLE-SPEED GEAR.

1,256,372.   Specification of Letters Patent.   Patented Feb. 12, 1918.

Application filed May 1, 1916. Serial No. 94,842.

*To all whom it may concern:*

Be it known that I, ARTHUR JOHN ROWLEDGE, a subject of the King of England, and residing at London, in England, have invented certain new and useful Improvements in Variable-Speed Gears, of which the following is a specification.

This invention relates to variable speed gear of the spur-wheel epicyclic type in which the speed variations are effected by means of clutches and brakes which are operative on certain members of the gear and has for its object to provide a simple form of such a gear which will enable three speeds to be obtained in the forward direction and a reverse. The clutches and brakes of the improved gear may be operated and controlled in various known ways either mechanically or electrically.

According to this invention the driving and driven shafts are disposed co-axially and to the driving shaft is connected one or more planetary members while a set of three separate gear wheels is mounted co-axially with but separate from the driving and driven shafts one of these wheels being in the form of an internally toothed ring. All these wheels gear with wheels of each planetary member and two clutches and two brakes so control the separate gear wheels that power will be transmitted through the planetary members to the driven shaft and the latter can be driven at the different predetermined speeds. The planetary member or each of them if more than one is provided comprises one or preferably two integral wheels which may be a pair but preferably are of different sizes. The gear wheels are preferably of three different sizes though sometimes two of them may be of the same size and form a pair to correspond with the pair of planet wheels with which they gear.

The accompanying drawings illustrate by way of example several alternative constructions of the improved variable speed gear. For convenience and for the sake of clearness these drawings are to a considerable extent diagrammatic.

In these drawings:—

Like letters indicate like parts throughout the drawings.

Figure 1:
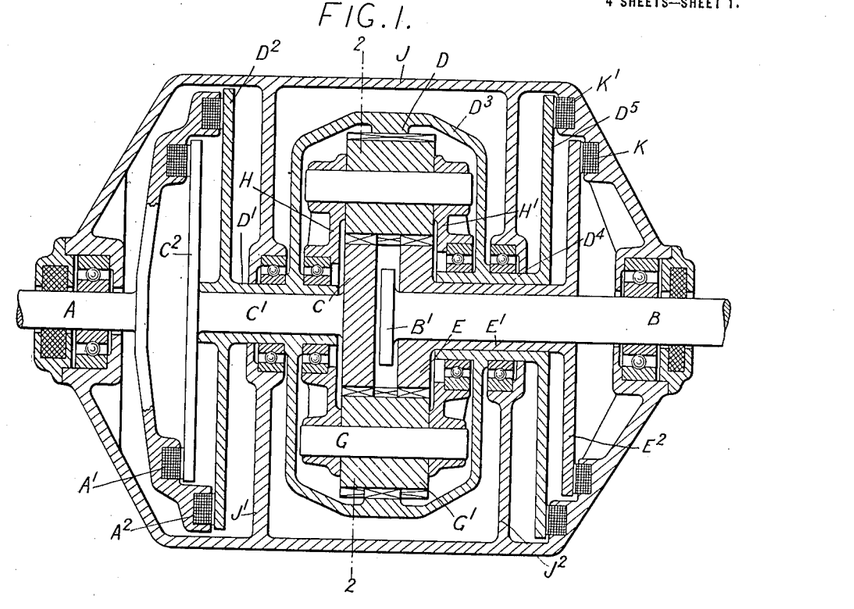
Figure 1 is a longitudinal sectional elevation of one construction of a three speed gear in accordance with the present invention. This construction shows the simplest form of such gear and electro-magnetic clutches and brakes are here illustrated as the means by which the variations in speed are brought about.
Figure 2:
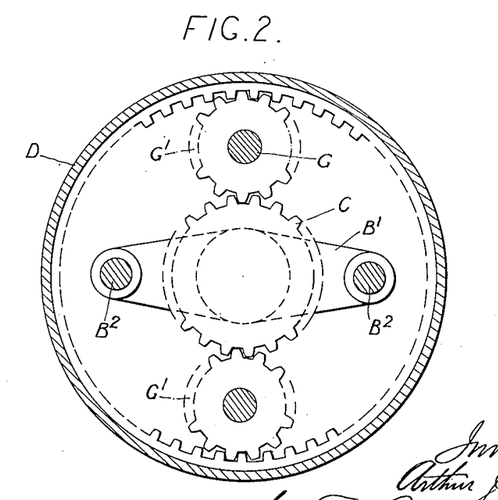
Fig. 2 is a diagrammatic transverse section on the line 2—2 of Fig. 1.

Referring to the construction illustrated in Figs. 1 and 2 the motor or driving shaft A has mounted upon it two clutch members $A'$ $A^2$ which in this case are of the electromagnetic type. Co-axially disposed in relation to the driving shaft A is the driven shaft B. A toothed wheel C is secured on one end of a shaft $C'$ the other end of which carries a clutch member $C^2$ adapted to engage the driving clutch member $A'$. The shaft $C'$ is disposed co-axially with the driving and driven shafts A and B and between the ends of these two shafts. The wheel C may conveniently be referred to as the first driving wheel. An internally toothed ring D is carried by a sleeve $D'$ loosely mounted on the shaft $C'$ and toward one end of this sleeve is disposed a clutch member $D^2$ adapted to engage the driving clutch member $A^2$. The toothed ring D may be designated the second driving wheel. The connection between the toothed ring D and the sleeve $D'$ is conveniently in the form of a casing or cage $D^3$ which incloses all the gear wheels including the planetary members. At the driven shaft end this casing $D^3$ is carried by a sleeve $D^4$ on the driven shaft B and on the end of this sleeve is a brake member $D^5$. Toward the end of the driven shaft B is a toothed wheel E carried on one end of a sleeve $E'$ which is loosely mounted on the driven shaft B.

On the opposite end of the sleeve E' is a brake member E². The sleeve E' is interposed between the driven shaft B and the sleeve D⁴ the latter being therefore directly carried by the sleeve E' and indirectly carried on the driven shaft B. In the present construction the toothed wheel E is of the same diameter as the toothed wheel C.

The planetary member is comprised by a spindle G on which is loosely mounted a broad toothed pinion G' which gears equally with the two gear wheels C and E. The spindle G is carried at its two ends by members H H' which are respectively supported conveniently with ball or roller bearings interposed on the sleeves D' and D⁴. The planetary member is connected to the driven shaft B by a spider or cross piece B' or some similar device arranged as shown in Fig. 2. Each end of the cross piece B' engages a bar B² the ends of these bars being securely attached to the end members H H' of the planetary system. In this way rotary motion imparted to the planetary member about the gear axis is communicated to the driven shaft B.

For convenience the planetary member is duplicated as shown each of these members being oppositely disposed with relation to the axis of the gear. Each planetary wheel G' meshes as mentioned with the two gear wheels C and E and also with the toothed ring D. The latter is conveniently positioned so that it engages the planet wheel G' about the center of its length while on the other hand the wheels C and E engage the planet wheel toward its opposite ends. It will be obvious that if preferred in place of a single planet wheel G' of the breadth shown two wheels may be employed the breadth of each being similar to that of either of the gear wheels C and E which latter are conveniently of similar dimensions. With such a construction the twin planet wheels are formed integral and the toothed ring D is disposed so as to gear with one of them. In such a case the connection between the planetary member and the end of the driven shaft B may be otherwise than as described and illustrated in Fig. 2 for example as shown in the other modifications of the gear hereinafter described and illustrated.

A fixed casing J incloses the whole gear together with the clutch and brake members and at the driven shaft end of this casing are mounted two brake members K and K'. The brake member K is arranged so as to engage the brake member E² of the wheel E while the brake member K' is adapted to engage the brake member D⁵ of the toothed ring D. The casing J is provided with partitions J' and J² which divide the interior of the casing into three compartments. In one of these compartments at one end of the casing lie the clutch members A' A² and C² and D² while the rotatable brake members E² and D⁵ are disposed in another compartment at the other end of the casing in which are arranged the fixed brake members K and K'. All the gear wheels thus lie in the central compartment. The partition J' extends inwardly to the sleeve D' and a ball or roller bearing may conveniently be here disposed. Similarly the partition J² extends inwardly to the sleeve D⁴ and a ball or like bearing may also be arranged there. By thus dividing up the casing it is possible to so isolate the gear wheels that fragments of the metal which may be worn off the clutch and brake members and other foreign matter which may be present in the clutch and brake compartments respectively is prevented from entering the central gear compartment and by getting into the oil which surrounds the gear wheels cause risk of damage to the gear. It also becomes possible with this arrangement to maintain either the clutch or brake members or both dry or to run one or other of these sets of members in oil. This arrangement is particularly advantageous where the clutches and brakes are as illustrated of the electro-magnetic type, but it is also useful where mechanically operated clutches and brakes are used.

The various speeds are obtained in the following manner in a gear thus constructed. It will be understood that in each case only those clutch and brake members which are indicated are operative the other clutch and brake members being out of action.

For the first or lowest speed the first driving wheel C is driven and the second driving wheel, that is to say the toothed ring D, is fixed by the brake members D⁵ and K'. The driving of the wheel C is brought about by engaging the clutch members C² and A'.

For the second speed the toothed ring D is driven by engaging the clutch members D² and A² while the wheel E is held against rotation by engagement of the brake members E² and K.

For the third speed both the toothed wheel C and the toothed ring D are driven by engaging both pairs of clutch members C² A' and D² A² no brakes being in operation. The whole gear is thus locked so that there is a direct drive and no relative rotation takes place between the several gear elements.

In order to obtain the reverse the driving wheel C is driven in the manner described while the wheel E is fixed by its brake.

As mentioned the construction described above and illustrated in Figs. 1 and 2 represents the gear in its simplest form in that both the gear wheels C and E are similar in dimensions while only a single planet wheel G' is required.

Figure 3:
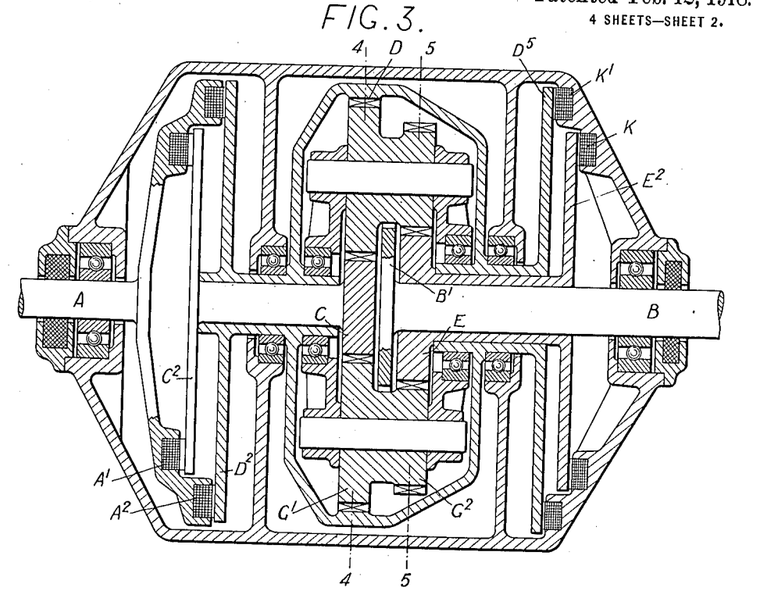
Fig. 3 is a longitudinal sectional elevation of a modified form of the improved gear also arranged to be controlled by electromagnetic clutches and brakes.
Figure 4:
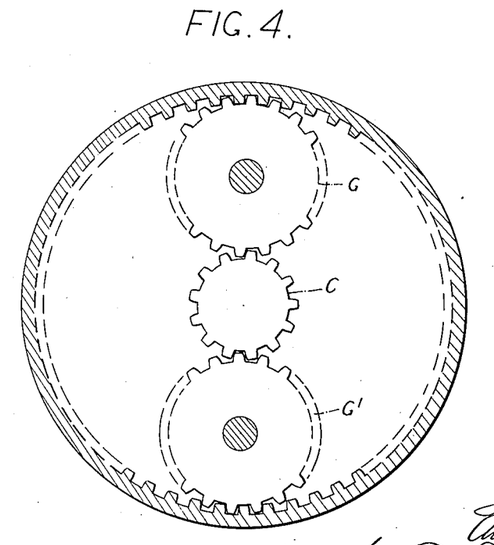
Fig. 4 is a diagrammatic transverse section on the line 4—4 of Fig. 3.
Figure 5:
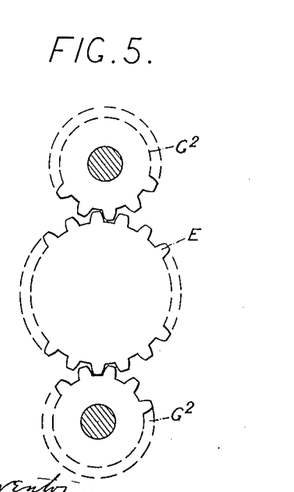
Fig. 5 is a similar section on the line 5—5 of Fig. 3.

Turning now to the construction shown in Figs. 3, 4, and 5 there is here illustrated a modification of the gear which differs only from the construction shown in Figs. 1 and 2 by reason of the gear wheels C and E being formed of different sizes with the natural result that two integral planet wheels G', G² are employed in place of the single broad planet wheel. In this case the wheel C is formed smaller than the wheel E. Consequently the planet wheel G' which gears with the wheel C is of greater diameter than the planet wheel G² which gears with the wheel E. The toothed ring is disposed so as to gear with planet wheel G'. The difference in the dimensions of the wheels produces a difference in the speed ratios obtainable in this form of the gear as compared with those obtainable from the simple form of the gear first described and illustrated in Figs. 1 and 2. The dispositions of the several parts of the gear together with the several clutch and brake elements are as already described in connection with the construction shown in Figs. 1 and 2. In this case however the connection between the planetary member and the end of the driven shaft B assumes the alternative form already indicated as possible where the planet wheels are two in number. On the end of the driven shaft B is mounted a spider or cross piece B' each end of which is forked and engages the hub of the integral planet wheels G' and G² between these wheels.

In this construction the several speeds are obtained in the following way:—

For the first or lowest speed the driving wheel C is driven while the toothed ring D is held against rotation by the engagement of the brake members D⁵ and K'.

For the second speed the toothed ring D is driven while the wheel E is fixed by means of the brake members E² and K.

For the third speed which gives a direct drive both sets of clutch members A' C² and A² D² are engaged so that the drive is transmitted both to the wheel C and to the toothed ring D. The whole gear is thus locked and no relative rotation of the wheels in the gear box occurs.

To obtain the reverse the wheel C is driven while the wheel E is held against rotation by its brake.

Figure 6:
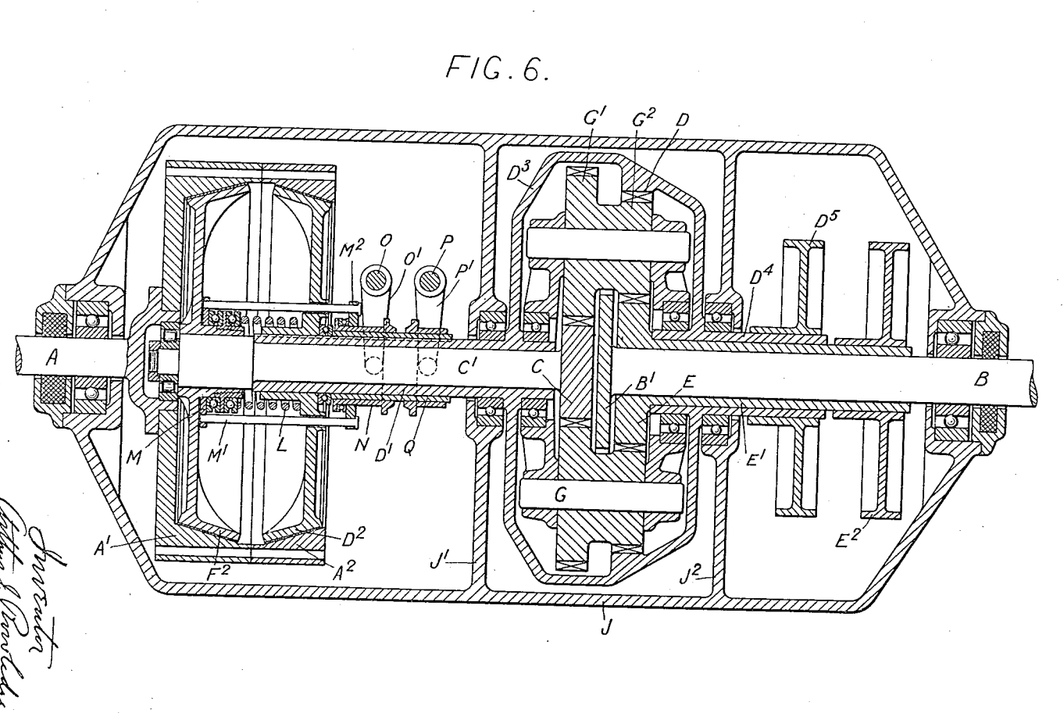
Fig. 6 is a longitudinal sectional elevation of a further modification of the gear which is in this case shown as being controlled by mechanical clutches and brakes.

Turning now to the construction shown in Fig. 6, this illustrates in the first place a further modification of the gear and secondly mechanical clutches and brakes for effecting the speed variations. With respect to the gear shown in this figure, this differs from that illustrated in Fig. 3, in that in place of the toothed ring D gearing with the larger planet wheel G' which in turn meshes with the driving wheel C this toothed ring D gears with the smaller planet wheel G² which in turn gears with the gear E. The toothed ring D is consequently of less diameter and thus a difference is obtained in the speed ratios as compared with the ratios obtainable with the gearing shown in Fig. 3. In other respects the gear illustrated in Fig. 6 is constructed and arranged in a manner similar to the gear shown in Fig. 3.

The mechanical clutches and brakes shown in Fig. 6 are to be taken as examples of clutches and brakes of this type which can be applied not only to the gear shown in connection with that in this figure, but equally to the other forms of gear herein described and illustrated in the other figures of the drawings. The clutches as illustrated are of the cone type but obviously they may be plate clutches or of the expanding type. The cone clutch member F² is carried on the end of the shaft C' so that it can slide axially thereon. The clutch member D² is similarly carried on the sleeve D'. Between the hubs of these clutch members is disposed a coiled spring L which presses equally in opposite directions the two cones F² and D² against corresponding conical clutch members A' A² mounted on the driving shaft A. Between the end of the spring L which bears against the clutch member F² and the hub of this clutch member is a loose collar M connected by rods M' disposed parallel to the gear axis with a loose collar M² disposed on an axially sliding sleeve N mounted on the sleeve D'. On a rock shaft O is mounted a lever O' which engages the sleeve N in some convenient manner so that when the shaft O is rocked the sleeve N can be moved axially. When thus moved to the right as shown in Fig. 6 the spring L will be compressed and the clutch member F² disengaged from the clutch member A' by reason of the pull exerted through the rods M'. When the rock shaft O is freed or rocked in the opposite direction the spring L will cause the clutch members F² and A' to engage. A second rock shaft P carries a lever P' which engages in some convenient manner a sleeve Q mounted so that it can slide axially on the sleeve D'. This sleeve Q actually lies between the sleeve N and the sleeve D' and the end of the sleeve Q bears against the hub of the clutch member D². When the shaft P is rocked in one direction the sleeve Q will be moved toward the left as shown in the drawing and the spring L will be compressed as the clutch member D² is moved out of engagement with the clutch member A². On releasing the rock shaft P the clutch members A² and D² will again come into engagement by reason of the action of the spring L. The rods M' as shown pass through the clutch member D² and consequently these rods and the loose collars M and M² of necessity rotate with the clutch member D². By the employment of ball bearings as illustrated the necessary movement can without difficulty be communicated in the manner described from the sleeve N to the clutch member F².

By means of this clutch mechanism it is possible to engage or hold out of engagement the two clutch members $F^2$ and $D^2$ either separately or simultaneously. This method of arranging and operating the clutches is similar to certain known clutch constructions and is illustrated by way of example to show how mechanically operated clutches may be employed for controlling the improved gears and effecting the necessary speed variations.

The mechanically operated brake employed in this case may be of some suitable type, but as illustrated each brake comprises a drum such as $D^5$ and $E^2$ to each of which may be applied in some convenient known manner a contracting brake band not shown in the drawings. Brakes of the expanding or other type may however be employed if desired. These brakes and clutches are conveniently operated by pedals levers or other suitable mechanism so arranged as to enable the clutches and brakes to be manipulated in the combinations necessary to effect the desired speed changes.

The manner in which the different speed variations are effected in this form of gear is the same as in the gear illustrated in Fig. 3, but for convenience these speed changes may be set forth again.

The first speed is obtained by engaging the clutch members $F^2$ and $A'$ and thus driving the wheel C the brake being simultaneously applied to the drum $D^5$ so as to hold the toothed ring D against rotation.

For the second speed the toothed ring D is driven by engaging the clutch members $D^2$ and $A^2$ while the sun wheel E is fixed by applying the brake to the drum $E^2$.

For the third speed by means of which a direct drive is obtained both clutches are engaged so that the drive is transmitted to the wheel C and also to the toothed ring D with the result that the whole gear is locked and no relative rotation of the wheels takes place.

For the reverse the wheel C is driven while the wheel E is braked.

Figure 7:
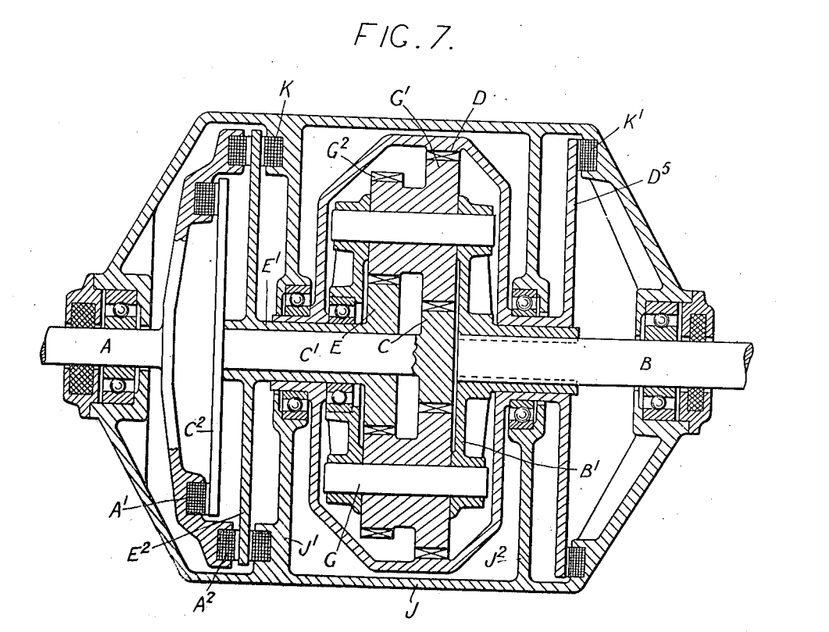
Fig. 7 is a similar view of yet another modification of the gear electro-magnetic clutches and brakes being again shown as the controlling means.

The modification of the gear shown in Fig. 7 while being in the main similar to the forms of the gear described above differs therefrom primarily in that in this case the toothed ring D is provided with a brake $D^5$ only and no clutch member. On the other hand the gear wheel E is provided not only with means for holding it against rotation but also with means for coupling it to the driving shaft. In this construction in place of the wheels C and E being disposed as in the previously described constructions one on either side of the connection B' between the driven shaft B and the planetary system both these wheels C and E are arranged between the end of the driven shaft B and the end of the driving shaft A. The sleeve E' which carries the sun wheel E is here mounted on the shaft C' on the end of which is the sun wheel C. The sleeve E' can thus be provided with a member $E^2$ which can be constructed to serve the double purpose of a clutch member and also a brake member. The clutches and brakes in this case are shown as being of the electromagnetic type and the fixed brake member K is here carried by the partition J' of the casing J. This fixed brake member K engages the member $E^2$ on one side while on the other side this member $E^2$ can be engaged by the clutch member $A^2$ carried by the driving shaft A.

The toothed ring D is as already mentioned here only provided with a brake member $D^5$, the clutch member by means of which this ring could be driven in the previously described constructions being omitted in this form of the gear. The toothed ring D engages in this instance with the larger planet wheel G' which is in turn in mesh with the smaller sun wheel C. The relative positions of the planet wheels G and G' are here reversed as compared with the positions of these wheels in the constructions shown in Figs. 3 and 6.

As will be seen in each of the constructions described and respectively illustrated in Figs. 1, 3 and 6 the two clutches by means of which certain of the sun wheels are driven are disposed in one of the end compartments of the casing J while the brake members are all disposed in the compartment at the opposite end of the casing J. In the construction shown in Fig. 7 however the brake members $D^5$ and K' are alone arranged in one of these end compartments while the compartment at the opposite end of the casing J contains the clutch members $C^2$, A' and $A^2$ together with the member $E^2$ and the fixed brake member K which acts on the member $E^2$.

In the form of the gear illustrated in Fig. 7 the connection B' between the driven shaft B and the planetary system is in the form of a disk or cross-piece which constitutes one end member of the planetary system and carries one end of each of the planet wheel spindles G.

The several speeds in this form of the gears are obtained in the following manner:—

For the first speed the wheel C is driven while the toothed ring D is held against rotation by engaging the brake members K and $D^5$.

For the second speed the wheel E is driven while the toothed ring D is again fixed.

For the third speed which gives a direct drive both clutches are engaged so that both wheels C and E are driven.

To obtain the reverse the wheel C is driven while the wheel E is held by means of the brake members K and E².

It will be understood that in either of the above mentioned gears the dimensions of the several wheels may be varied in order to obtain any particular speed ratio that may be desired.

The clutches and brakes if of the electromagnetic type may be controlled in various ways as found convenient. In some cases it may be desirable to construct and arrange the clutches so that they are mechanically operated while the brakes are of the electromagnetic type or conversely electro-magnetic clutches may be used in combination with mechanically operated brakes.

What I claim as my invention and desire to secure by Letters Patent is:—

1. In an epicyclic variable speed gear of the spur wheel type, adapted to provide a plurality of forward speeds and a reverse, the combination of a driving shaft, a plurality of clutch members mounted on said shaft, a driven shaft coaxial with the driving shaft, a set of gears grouped adjacent each other and separate from but mounted coaxial with the driving and driven shafts, one of said gears being an internally toothed ring, a toothed planetary member directly engaging each of said gears, all of the operative parts of said planetary member being integral and adjacent each other, a plurality of clutch members each connected with one of said gears and coöperating with the clutch members on the driving shaft, and a plurality of brakes each controlling one of said gears, all of said gears being directly controlled by the clutches and brakes.

2. In an epicyclic variable speed gear of the spur wheel type, adapted to provide a plurality of forward speeds and a reverse, the combination of a driving shaft, two clutch members mounted on said shaft, a driven shaft coaxial with the driving shaft, three gears separate from but mounted coaxial with the driving and driven shafts, one of said gears being an internally toothed ring, and the other gears being integral and adjacent each other, a toothed planetary member directly engaging each of said gears, all operative parts of said member being integral and adjacent each other, clutch members connected with two of said gears and coöperating with the clutch members on the driving shaft, and two brakes coöperating with two of said gears, all of said gears being directly controlled by the clutches and brakes.

3. In an epicyclic variable speed gear of the spur wheel type, adapted to provide a plurality of forward speeds and a reverse, the combination of a driving shaft, two clutch members mounted on said shaft, a driven shaft coaxial with the driving shaft, three gears separate from but mounted coaxial with the driving and driven shafts, one of said gears being an internally toothed ring, and the other two being integral and adjacent each other, a planetary member comprising two integral, adjacent wheels, one engaging the internally toothed ring and another one of said gears and the other engaging the other of said gears, clutch members connected with two of said gears and coöperating with the clutch members on the driving shaft, and two brakes coöperating with two of said gears, all of said gears being directly controlled by the clutches and brakes.

4. In an epicyclic variable speed gear of the spur wheel type, the combination of a driving shaft, two clutch members mounted on said shaft, a driven shaft coaxial with the driving shaft, three gears separate from but mounted coaxial with the driving and driven shafts, one of said gears being an internally toothed ring, a planetary member comprising two integral wheels of different diameters, one engaging the internally toothed ring and another one of said gears, and the other engaging the other of said gears, clutch members connected with two of said gears and coöperating with the clutch members on the driving shaft, and two brakes coöperating with two of said gears, all of said gears being directly controlled by the clutches and brakes.

5. In an epicyclic variable speed gear of the spur wheel type, adapted to provide a plurality of forward speeds and a reverse, the combination of a driving shaft, a driven shaft coaxial with the driving shaft, two separate gears mounted coaxial with but separate from said shafts, means for coupling one of said gears to the driving shaft, means for holding the other of said gears against rotation, a planetary member connected with the driven shaft and directly engaging both said gears, an internally toothed ring surrounding and directly engaging the planetary member, means for coupling said ring to the driving shaft, and means for holding said ring against rotation.

6. In an epicyclic variable speed gear of the spur wheel type, adapted to provide a plurality of forward speeds and a reverse, the combination of a driving shaft, a driven shaft coaxial with the driving shaft, a planetary member connected with the driven shaft and comprising two integral wheels arranged adjacent each other, two separate gears mounted coaxial with but separate from the driving and driven shafts and each gearing with one of the planetary wheels, a clutch for connecting one of said gears to the driving shaft, a brake for holding the other of said gears against rotation, an internally toothed ring surrounding and gearing with one of the planetary wheels, a clutch for connecting said ring to the driving shaft, and a brake for holding said ring against rotation.

7. In an epicyclic variable speed gear of the spur wheel type, adapted to provide a plurality of forward speeds and a reverse, the combination of a driving shaft, a driven shaft coaxial with the driving shaft, a planetary member connected with the driven shaft and comprising two integral wheels arranged adjacent each other, two separate gears mounted coaxial with but separate from the driving and driven shafts and disposed on opposite sides of the connection between the driven shaft and planetary member, said gears meshing with the planetary gears, a clutch for connecting one of said gears to the driving shaft, a brake for holding the other of said gears against rotation, an internally toothed ring surrounding and gearing with one of the planetary wheels, a clutch for connecting said ring to the driving shaft, and a brake for holding said ring against rotation.

8. In an epicyclic variable speed gear of the spur wheel type, the combination of a driving shaft, a driven shaft co-axial with the driving shaft, a planetary member connected with the driven shaft and comprising two integral wheels of different diameters, two gears mounted coaxial with but separate from the driving and driven shafts, and disposed on opposite sides of the connection between the planetary member and driven shaft, said gears respectively engaging the planetary wheels, an internally toothed ring surrounding and engaging one of the planet wheels, means for clutching one of said gears to the driving shaft, means for holding the other of said gears against rotation, means for connecting the internally toothed ring to the driving shaft, and means for holding said ring against rotation.

9. In an epicyclic variable speed gear of the spur wheel type, the combination of a driving shaft, a driven shaft co-axial with the driving shaft, a planetary member connected with the driven shaft and comprising two integral wheels of different diameters, two gears of different diameters mounted coaxial with but separate from the driving and driven shafts and disposed on opposite sides of the connection between the planetary member and driven shaft, said gears respectively engaging the planetary wheels, an internally toothed ring surrounding and engaging one of the planet wheels, means for clutching one of said gears to the driving shaft, means for holding the other of said gears against rotation, means for connecting the internally toothed ring to the driving shaft, and means for holding said ring against rotation.

10. In an epicyclic variable speed gear of the spur wheel type, the combination of a driving shaft, a driven shaft co-axial with the driving shaft, a planetary member connected with the driven shaft and comprising two integral wheels of different diameters, two gears of different diameters mounted co-axial with but separate from the driving and driven shafts and respectively engaging the planetary wheels, an internally toothed ring surrounding and engaging one of the planet wheels, a clutch for connecting one of the gears to the driving shaft, a brake for holding the other gear against rotation, a clutch for connecting the toothed ring to the driving shaft, and a brake for holding said ring against rotation.

11. In an epicyclic variable speed gear of the spur wheel type, the combination of a driving shaft, a driven shaft co-axial with the driving shaft, a planetary member connected to the driven shaft, a set of three wheels mounted co-axial with but separate from the driving and driven shafts one of these wheels being in the form of an internally toothed ring and all these wheels gearing with the planetary member, a plurality of clutches operative to separately couple a plurality of said wheels to the driving shaft, a plurality of brakes operative to separately hold a plurality of said wheels against rotation, one of these wheels on which a brake is operative being also capable of being driven through one of the clutches, a casing inclosing the gear wheels the clutches and the brakes, and partitions in this casing which so divide it into compartments that the clutches and brakes are separated from the gear wheels as set forth.

12. In an epicyclic variable speed gear of the spur wheel type the combination of a driving shaft, a driven shaft co-axial with the driving shaft, a planetary member, a connection between the planetary member and the driven shaft, two separate wheels mounted co-axial with but separate from the driving and driven shafts and disposed one on either side of the connection between the driven shaft and the planetary member, both of these wheels gearing with the planetary member, a wheel in the form of an internally toothed ring mounted co-axial with but separate from the driving and driving shafts and gearing with the planetary member, two clutches disposed at that side of the group of gear wheels which is adjacent to the end of the driving shaft these clutches being operative to separately couple two of these gear wheels to the driving shaft, two brakes disposed at the side of the group of gear wheels which is opposite to the clutches these brakes being operative to separately hold two of these wheels against rotation, a casing inclosing the gear wheels the clutches and the brakes, and partitions in this casing which so divide it into compartments that the clutches and brakes are separated from each other and from the gear wheels as set forth.

13. In a variable speed gearing of the character referred to, the combination of a driving shaft, a coaxial driven shaft, a casing inclosing the adjacent ends of said shafts and having its interior divided into a plurality of compartments by transverse partitions, two gears mounted in one of the compartments of the case coaxial with but separate from the driving and driven shafts, a planetary member connected with the driven shaft and engaging said gears, an internally toothed ring surrounding and engaging the planetary member, clutches in another compartment of the casing adapted to respectively connect said ring and one of said gears to the driving shaft, and brakes arranged in a third compartment of the casing for holding the other of said gears and the internally toothed ring against rotation.

14. In a variable speed gearing of the character referred to the combination of a driving shaft, a driven shaft, coaxial with the driving shaft, two gears mounted coaxial with but separate from the driving and driven shafts, a planetary member connected with the driven shaft and engaging both said gears, a casing inclosing said gears and planetary member and having on its interior teeth engaging the latter, a clutch for connecting the driving shaft to one of said gears, a brake for holding the other of said gears against rotation, a second clutch for connecting said casing to the driving shaft, and means for holding said casing against rotation.

In testimony whereof I have signed my name to this specification in the presence of two subscribing witnesses.

ARTHUR JOHN ROWLEDGE.

Witnesses:
  EUSTACE HENRY BURKE,
  ERNEST PARK.